United States Patent Office 3,097,058
Patented July 9, 1963

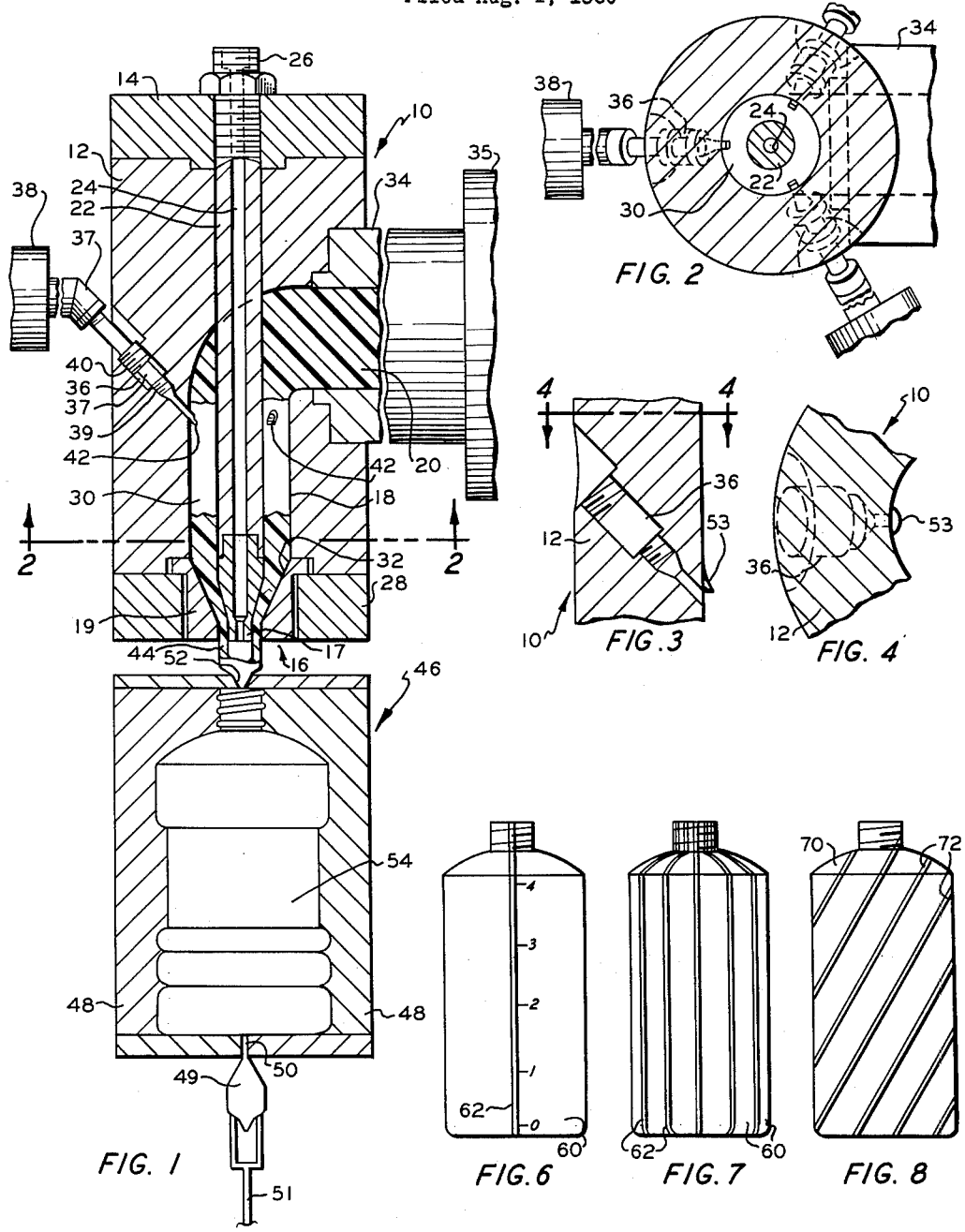

3,097,058
EXTRUSION OF THERMOPLASTIC RESINS
Tony E. Branscum and John E. Havely, Bartlesville, Okla., assignors to Phillips Petroleum Company, a corporation of Delaware
Filed Aug. 1, 1960, Ser. No. 46,402
13 Claims. (Cl. 18—55)

This invention relates to a process for extruding thermoplastic resins. A specific aspect of the invention relates to a process for extruding such resins into tubes and blow molding the tubes into containers, and to the tubes and containers produced by the process.

Extrudable and moldable plastics and resins are being formed into various types of thermoplastic containers, such as screw-top rigid and squeeze-type bottles and other covered containers. Such containers are usually non-transparent so that when used to contain and dispense such materials as drugs, insecticides, lotions, ointments, detergents, etc., in liquid form, and even powdered solid materials, the user is unable to see the level of material in the container without removing the lid or cap. This is especially true of squeeze bottles which have a small orifice in a cone-shaped delivery spout under the screw-cap of the bottle.

Accordingly, it is an object of the invention to provide a process for extruding thermoplastic resins into useful articles such as tubes, pipes, and containers which contain a "sight-glass." Another object is to provide a process for producing tubing and containers of non-transparent resins having a transparent stripe therein for observation purposes. It is also an object of the invention to provide a method of making striped decorative tubes and containers. Other objects of the invention will become apparent on consideration of the accompanying disclosure.

Broadly, the invention comprises simultaneously extruding a first relatively large stream of a melt of thermoplastic resin and at least one additional relatively small stream of a melt of thermoplastic resin thru a common annular passageway of a tube forming die to form a tube, one of said melts being of different color than the other whereby said second melt forms at least one stripe lengthwise of the tube. In a preferred embodiment, the stripe is transparent while the first melt forming the main body of the tube is color pigmented to any desired color or translucent to opaque white. In this way, the color pigmented plastic adds beauty to the article and the transparent stripe provides additional utility. More than one transparent stripe can be incorporated in the tube or bottle so as to increase the utility thereof by avoiding excessive turning of the bottle in order to see the level of material therein.

A more complete understanding of the invention may be had by reference to the accompanying schematic drawing of which FIGURE 1 is an elevation in partial section of an arrangement of apparatus for extruding and blow molding in accordance with the invention; FIGURE 2 is a horizontal cross section of the apparatus of FIGURE 1 taken on the line 2—2; FIGURE 3 is a fragmentary section in elevation of a die head wall showing a means for injecting auxiliary melt; FIGURE 4 is a fragmentary plan view of the arrangement of FIGURE 3 taken on the line 4—4; FIGURE 5 is a section of tubing or pipe produced by the process of the invention; and FIGURES 6, 7, and 8 are blow molded bottles illustrating the invention.

Referring to FIGURES 1 and 2, a die head 10 comprises a main body 12, a cap 14 and a die 16. An axial chamber 18 is streamlined into a side inlet 20 of substantially the same diameter. An axial tube or mandrel 22 extends thru cap 14 to die 16, providing an air passage 24 extending completely thru the die head. The upper end 26 of the axial tube or mandrel 22 is adapted for attachment to compressed gas supply (air) not shown. Inner die section 17 threads into the lower end of tube or mandrel 22. The outer die section 19 is held in position by plate 28. Annulus 30 in chamber 18 is continuous with tapered die annulus 32. Conduit 34 connects extruder 35 with inlet 20 of the die head. The apparatus thus far described is conventional for tube extrusion.

A second or auxiliary extrusion means comprises bore 36 extending obliquely thru die head 10 to chamber 18 together with tube 37 and extruder 38 connected therewith. Extruders 35 and 38 are conventional type extruders for extruding thermoplastic resins and need no further discussion. Extruder 38 is of substantially smaller capacity than extruder 35. Tube 37 which is flattened on the delivery end to form a rectangular outlet 42 projects into chamber 18. Orifice 42 is sized to control the flow of extrudate, within limits, into the tubing forming chamber. One or a plurality of these smaller extruders 38 are connected with a like number of injection conduits 37 positioned symmetrically around chamber 18 or in any suitable pattern to produce a desired arrangement of stripes in the extruded tube. Tube 37 is provided with a shoulder which is threaded at 39 into the wall of bore 36. A second threaded shoulder is provided on tube 37 at 40. In this way, the projection of tube 37 into annulus 30 is controllable.

The device thus far described extrudes a tube 44 which can be recovered as such or which can be blow molded into a suitable container. A conventional method of blow molding utilizes a mold 46 comprising two identical halves 48 which pinch off the tube or parison at 50 and 52. The pinch-off at 50 is complete to seal the parison at the bottom while that at 52 leaves a small orifice such as one of a diameter of about 0.060–0.080, which permits injection of air or other blowing gas into the parison to force the walls thereof quickly and uniformly outwardly against the die shape to form bottle 54, for example. Finger 51 is actuated by means not shown to reach up to receive the bottle end of the parison after mold 46 is opened and bottle 54 is removed.

In FIGURES 3 and 4, bore 36 extends thru the wall 12 of die head 10. The outer end of bore 36 is provided with a threaded opening for attaching an adapter conduit (not shown) to an auxiliary extruder 38. A baffle 53 is positioned just above the orifice of bore 36 to provide a momentary void in the main melt so that the strip introduced thru bore 36 extends completely thru the wall of the tube or parison. Baffle 53 may be attached to the wall of the die head by any suitable means as by welding or conventional fastening means (not shown).

The extension of baffle 53 into annulus 30 can be controlled to regulate the depth of delivery of the auxiliary melt. However, it is feasible to inject thru bore 36 without baffle 53 and form a stripe in the tube or parison; but the extension of tube 37 into the annulus 30 or use of baffle 53 facilitates the forming of the stripe entirely thru the tube or parison.

The width of the orifice thru which the auxiliary melt is delivered controls, within limits, the width of the stripe. However, the relative delivery rates or flow of the melts also affects the width of the stripe. By increasing the flow of auxiliary melt relative to the flow of main melt (increasing extrusion pressure) the width of the stripe is increased and vice versa.

Orifice 42, or bore 36 may be positioned at any locus within chamber 18 (annulus 30) upstream of die 16. Once the auxiliary melt is extruded into the main melt which has taken tube form, the stripe is formed and will remain as such during the remainder of the passage thru the extrusion annulus.

Two or more closely spaced stripes of the same material may be implanted in the tube by utilizing a plurality of orifices, closely spaced, at the delivery end of tube 37 or bore 36. Small partitions or separators in the end of tube 37 or in bore 36 effect this embodiment of the invention.

FIGURE 5 illustrates a striped tube produced by the apparatus of FIGURES 1 and 2 wherein the body of the tube 56 is translucent to opaque white or of pigmented color and stripes 58 are transparent or of the same or different colors but contrasting with the color of the body portion 56. This pipe can be utilized as such or it can be blown into a suitable container. One utility for pipe with one or more colored stripes is in electrical conduits. The colored stripe can be utilized to identify a plurality of circuits or groups of wires for such circuits. In another application, a colored stripe in a translucent to opaque white, black or colored pipe serves to identify the pipe with the manufacturer or with the brand. A great volume of polyethylene and polypropylene pipe is being produced for conduits and chemical application and for ordinary plumbing. In fact, plastic pipe is being used in practically all applications in lieu of metal pipe. A pipe fabricated with one or more transparent stripes with or without a colored stripe can be utilized to advantage in applications in which the pipe is carrying visible fluids. With this type of pipe, the movement of fluids there thru is readily observable. Another use is in tube type gauges in lieu of breakable glass.

FIGURE 6 illustrates a rigid or semi-rigid bottle container adapted to be sealed with a screw top. This bottle 60 is blow molded from a pipe having a transparent stripe 62 which provides a sight-glass for observation of the level of contents in the bottle. The transparent stripe may be calibrated in ounces, cubic centimeters or other suitable volume units. It may also be calibrated to indicate the fractions of the original volume remaining in the bottle, as in the figure which indicates fourths of full volume. Another application is in the dispensing of liquids such as insecticides wherein the bottle is filled to a set level with insecticide and a higher level is indicated on the bottle for filling with water or other diluent before dispensing. To illustrate, the manufacturer might provide a squeeze bottle similar to that shown in FIGURE 6 with a low-level mark to which it is filled with any suitable chemical and a high-level mark to which it is filled by the consumer with water or other diluent before application. Bottle 60 may be provided with colored stripes on a different colored or a translucent or opaque white body for decorative purposes.

FIGURE 7 illustrates a blown bottle 60 from tubing provided with a plurality of stripes 62, which may be of a single color on a white or colored body in contrast to the stripes. The stripes may be of the same or different colors and may include one or more transparent stripes.

FIGURE 8 illustrates a blown bottle 70 provided with helical stripes 72 which may be colored and include a transparent stripe. This design or pattern may be produced by rotating the parison from which the bottle is blown just before clamping the mold around the parison; e.g., finger 51 of FIGURE 1 may be rotated from ½ to 1 turn to twist or spiral the parison and produce a helical stripe or stripes. Even though finger 51 deforms the bottom of the pinched parison, the action of the device is easily regulated so that a section 49 is provided as waste.

All types of plastics and resins which are amenable to extrusion and blow molding may be provided with stripes in accordance with the invention. The resin forming the main body of the tube may be the same as or of a different resin than the resin from which the stripes are made. However, it is necessary that the resins are compatible with each other and join in the melt to form a strong tube.

Resins particularly suitable for extrusion and blow molding in accordance with the invention are the high density polyolefins made in accordance with the Hogan and Banks patent, No. 2,825,712, issued March 4, 1958. This family of polyolefins known by the trademark "Marlex" (trademark of Phillips Petroleum Company) are of higher density than ordinary high pressure polyolefins. To illustrate, polyethylene of this type has a density of 0.96 to 0.98 as compared with high pressure polyethylene which has a density of about 0.92. Even when copolymerized with minor amounts of other olefins such as 1-butene, the density of the ethylene copolymer is above 0.94. However, the invention is applicable to all types of extrudable and moldable thermoplastic resins.

In operation with the apparatus of the drawing, the resin which is to form the main portion of the pipe or tube is extruded as a melt in conventional manner thru the die head. Simultaneously, one or more minor streams of melt, either transparent or colored or both, are extruded thru channels 36 or tube 37 downwardly thru orifices 42 into the side of the tube being formed of the melt from the main extruder 35. This small stream of melt forms a stripe in the side of the tubing by displacing the main melt. The width of the stripe is controlled to a limited extent by the diameter of orifice 42. However, with a given orifice size the width of the stripe may be varied considerably by varying the rate of extrusion or flow of melt thru channel 37 in relation to a fixed rate of extrusion thru channel 20 controlled by extruder 35. In one application, a 1½" extruder was utilized on the main melt (extruder 35) while a one inch extruder was utilized to extrude the stripe into the tube. With this arrangement, a semi-rigid bottle of the type shown in FIGURE 6 was produced of a blue colored pigmented resin (polyethylene) having a transparent stripe running lengthwise of the bottle. The stripe had a width of less than ¹⁄₁₆ of an inch and the bottle had a diameter of 1⅞ inches. Utilizing similar apparatus, a pipe having an external diameter of ¹³⁄₁₆" and an internal diameter of ¹¹⁄₁₆" was extruded with a stripe ³⁄₁₆" wide. The main body of the pipe was translucent white and the stripe was of red pigmented polyolefin. In the foregoing applications the plastic was "Marlex" polyethylene.

The stripes produced by the device shown and described are surprisingly uniform, probably because of the automatic or constant pressure controls on conventional extruders. The depth of penetration is also uniform and was made to extend all the way thru the parison from which the bottle of FIGURE 6 was blown, so that the stripe offered excellent visibility or observation of liquid level in the bottle. In a tube extruded from natural colored polyethylene (translucent white) a red stripe was formed which was ³⁄₁₆" wide and extended to within less ¹⁄₆₄" of the inside surface of the tube. The wall thickness was ¹⁄₁₆" and the tube had a diameter of ⅞₁₆".

In one embodiment of the invention, orifice 42 had a width of 0.250" and a height of 0.025". The stripe in the aforesaid tube was extruded thru this orifice. By using greater or lesser pressure in the auxiliary extruder, the width and depth of the stripe can be increased or decreased considerably.

Certain modifications of the invention will become apparent to those skilled in the art and the illustrative details disclosed are not to be construed as imposing unnecessary limitations on the invention.

We claim:

1. A process for extruding and blow molding a generally cylindrical container of translucent to opaque thermoplastic material having a transparent stripe extending longitudinally thereof which comprises extruding an initial tube of solely said material from a hot plastic mass thereof; simultaneously extruding a hot plastic strip of transparent thermoplastic material into the wall of the already formed tube to displace a comparable portion of the translucent to opaque material to form a striped tube adapted for blow molding; and blow molding said striped tube into a container having a transparent stripe lengthwise thereof.

2. A process comprising extruding a first melt of a thermoplastic resin thru an annular passageway to form an initial tube solely of said first melt; simultaneously extruding at least one relatively small stream of a second melt of a thermoplastic resin visibly different from said first melt directly into the side of the already formed tube within said passageway to join with and displace a longitudinal section of said first melt therein to form a modified tube in which said second melt appears as at least one stripe; and extruding said modified tube thru a tube-forming die to produce a final tube having a visible stripe therein.

3. The process of claim 2 wherein said final tube is blow molded into a container having at least one stripe extending longitudinally thereof.

4. The process of claim 2 wherein said first melt is color pigmented and one said second melt is transparent so as to form a transparent stripe longitudinally of said final tube.

5. The process of claim 2 wherein said first melt is color pigmented, one said second melt is transparent, and said final tube is blow molded into a container in which said stripe is transparent and extends from the top to the bottom of said container to provide a level gauge therein.

6. The process of claim 5 using high density polyethylene as said melts.

7. The process of claim 2 wherein said melts consist essentially of high density polyolefins.

8. The process of claim 2 wherein a plurality of said relatively small streams of melt are introduced at spaced intervals around said annular passageway to produce stripes in said tube.

9. The process of claim 8 further comprising blow molding said tube into a container.

10. The process of claim 2 wherein the extrusion pressure on the second melt is controlled so as to form a stripe extending only partially thru said final tube.

11. The process of claim 2 wherein the extrusion pressure on the second melt is controlled so as to extend the stripe completely thru said final tube.

12. The process of claim 8 further comprising applying torque to the lower end of said tube to twist same and thereafter blow molding same into a container having helical stripes.

13. In the process of claim 2 the method of controlling the width of the stripe of said small stream of melt comprising varying the rate of feeding said small stream thru a small passageway of fixed bore into said annular passageway.

References Cited in the file of this patent

UNITED STATES PATENTS

| | | |
|---|---|---|
| 1,952,470 | Stephens | Mar. 27, 1934 |
| 2,009,250 | Connor | July 23, 1935 |
| 2,138,378 | Johnson | Nov. 29, 1938 |
| 2,141,776 | Vautier et al. | Dec. 27, 1938 |
| 2,597,558 | Bailey | May 20, 1952 |
| 2,669,752 | Pratt | Feb. 23, 1954 |
| 2,750,625 | Colombo | June 19, 1956 |
| 2,779,970 | Stocker | Feb. 5, 1957 |
| 2,808,617 | Terracini et al. | Oct. 8, 1957 |
| 2,830,721 | Pinsky et al. | Apr. 15, 1958 |

FOREIGN PATENTS

| | | |
|---|---|---|
| 690,508 | Great Britain | Apr. 22, 1953 |